Figure 1:
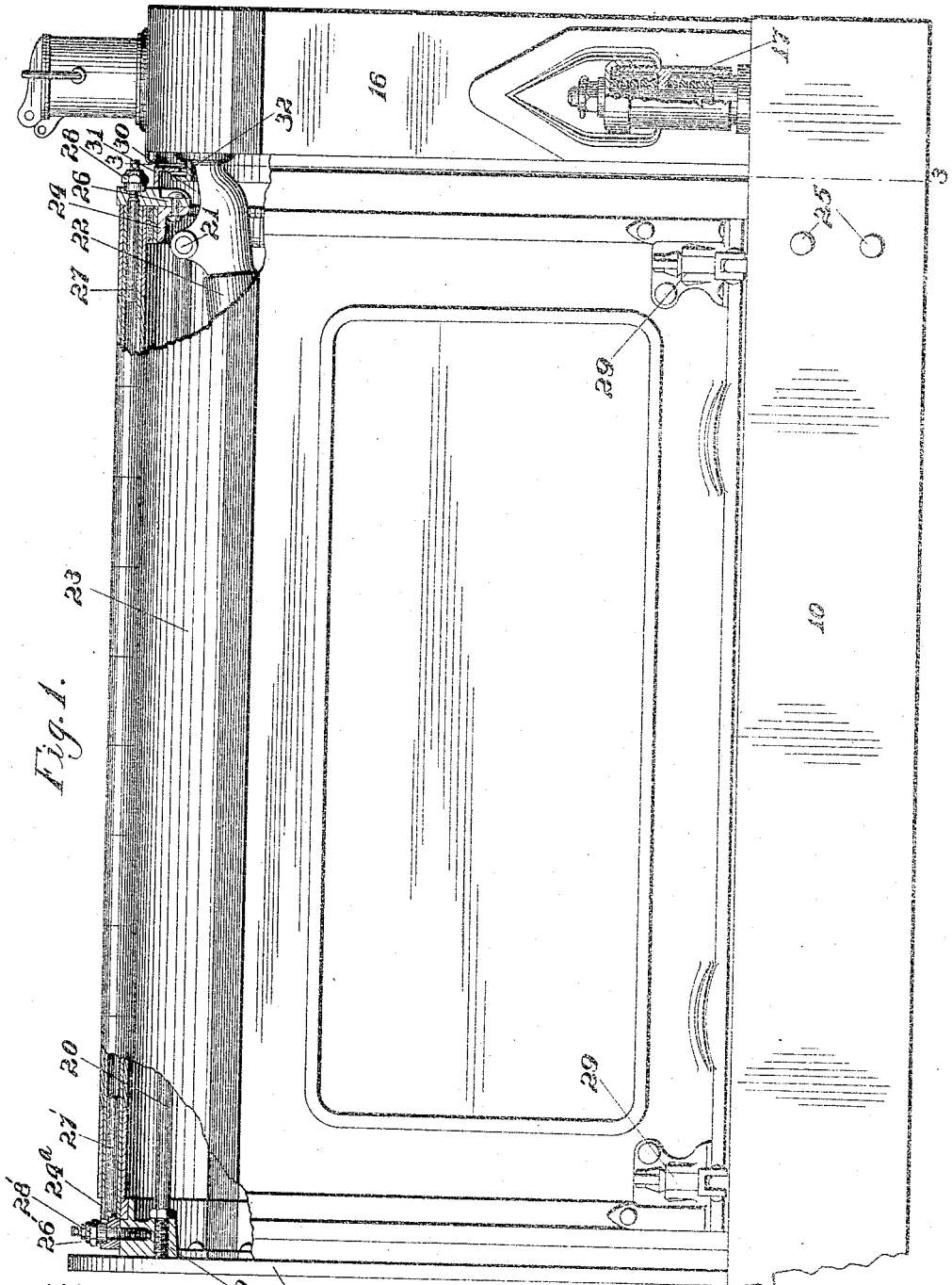

H. D. CHURCH.
MOTOR VEHICLE.
APPLICATION FILED OCT. 1, 1914.

1,200,809.

Patented Oct. 10, 1916.
2 SHEETS—SHEET 1.

Witnesses:
Clair J. Cote
Rui J. Williams

Inventor:
Harold D. Church,
By Milton Tibbetts,
Attorney.

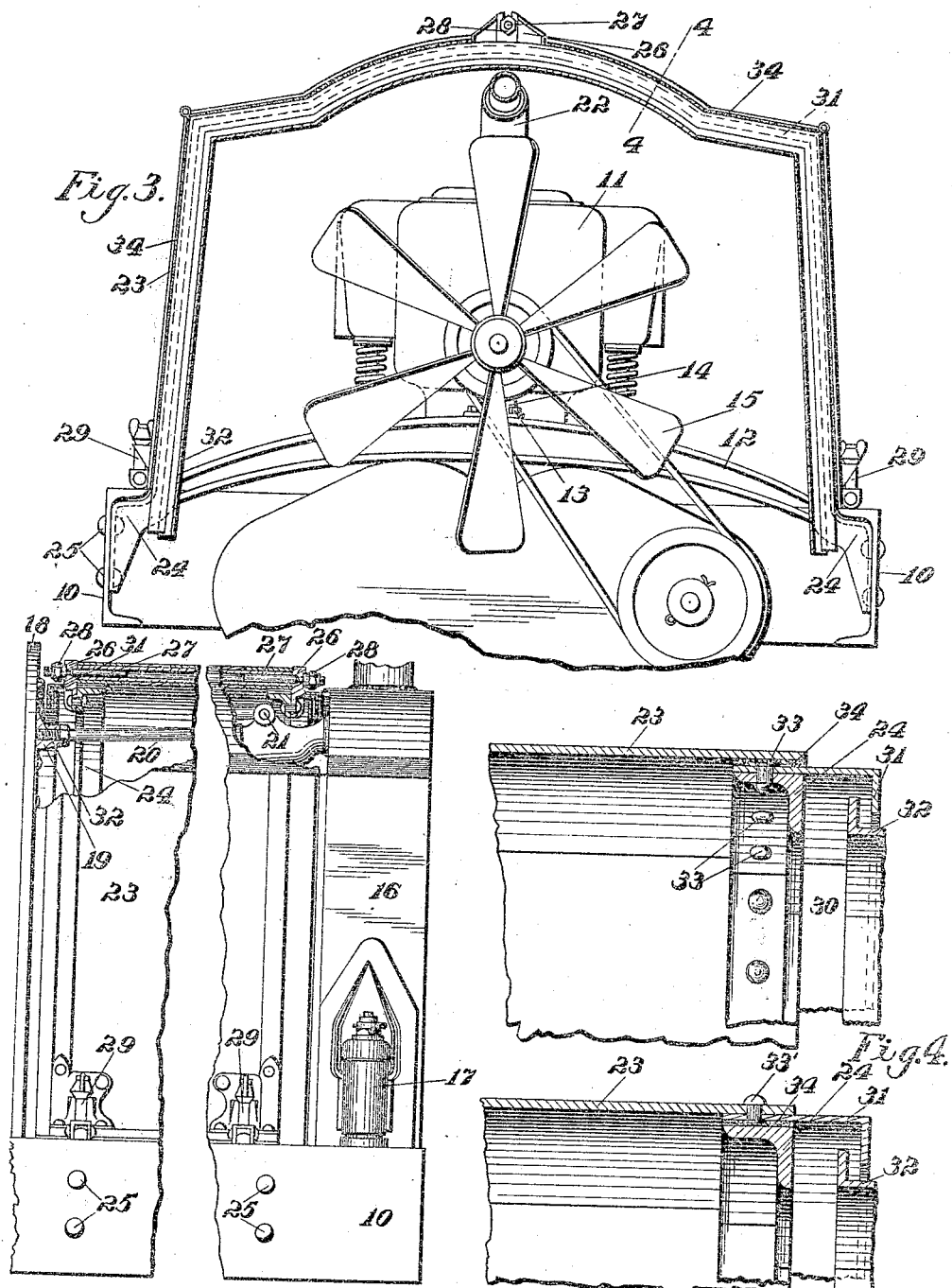

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,200,809.   Specification of Letters Patent.   Patented Oct. 10, 1916.

Application filed October 1, 1914.  Serial No. 864,458.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles, and particularly to improvements in means for inclosing and protecting the motor thereof.

One of the objects of the invention is to provide a motor housing, comprising an end member, and an intermediate or cover member mounted independently of the end member.

Another object of the invention is to provide a motor housing which comprises a radiator casing, and a dash as end members, and an intermediate or cover member so mounted that the vibration or movement of the radiator and dash are not transmitted to the intermediate member.

Another object of the invention is to provide a connection between adjacent edges of the radiator casing and motor cover that will permit relative movement between the edges while preventing passage of water therebetween.

These and other objects will appear from the following description read in connection with the drawings which form a part of this specification and in which:—

Figure 1 is a side elevation of the front portion of a motor vehicle embodying this invention, certain parts being broken away; Fig. 2 is a view similar to Fig. 1 of another form of the invention; Fig. 3 is a sectional view approximately on the line 3—3 of Fig. 1; Fig. 4 is an enlarged sectional view of parts approximately on the line 4—4 of Fig. 3; and Fig. 5 is a similar view of another form of the invention.

Referring to the drawings, 10 represents the frame side members, upon which the motor 11 is suitably mounted. Upon one of the cross supporting members 12 of the motor is secured as by bolts 13, a supporting bracket 14 for the cooling fan 15 which may be driven by the motor in any well-known manner.

A radiator casing 16 is mounted adjacent the forward end of the motor just in front of the fan 15, thus forming the front end member of the motor housing. It is preferably flexibly mounted on the frame, as by the spring devices 17 which permit it to move relatively to the frame members 10, thus absorbing vibration and preventing straining the casing. It will be understood also that the radiator is connected with the water system of the motor 11 by means of a flexible conduit 22.

The body or chassis dash 18 which forms the rear end member of the motor housing, is shown as arranged at a point rearwardly of the motor 11 and has mounted thereon a bracket 19 to which a brace rod 20 for the radiator is connected at its rear end and which is pivotally connected at its forward end as at 21 to the radiator 16.

It will be seen that the motor housing comprises three members, the end members which may be the radiator casing and dash as shown, and an intermediate member or motor cover 23 preferably composed of panel sections supported independently of one or both of the end members as hereinafter described.

Referring particularly to Fig. 1, a bracket 24 which may be of arch construction, is mounted upon the frame side members and secured thereto as by rivets 25, the bracket being placed adjacent the front end member, and a bracket 24ᵃ may be mounted on the dash 18 or rear end member as shown. Suitably arranged on the uppermost portion of the bracket 24 is a lug or supporting piece 26 having a boss in which a rod 27 may be secured as by nut 28. Threaded in the bracket 24ᵃ is a stud bolt 26′ on which is supported the rod 27′ by means of the nut 28′. The rods 27 and 27′ act as a trunnion or hinge for the oppositely extending panel sections of the motor cover 23, which sections are suitably secured at their lower end to the frame member as by fasteners 29. In this construction the intermediate member is supported on one of its end members and independently of the other of its end members in the manner above described. Also, in order to permit movement of the end member 16 relatively to the cover member 23 the supporting bracket 24 for the cover is located adjacent to but out of contact with, the end member 16, leaving a gap or opening 30 therebetween. To properly close this gap and thereby prevent passage of water therethrough, there is provided a deflector flange or plate 31 on one of the adjacent edges and a gutter 32 on the other, said flange and gutter being suitably arranged on, or secured to, the cover member 23 or its supporting bracket 24 and adjacent end member 16, respectively.

In the form of invention shown in Fig. 4, the means for closing the gap between the intermediate member and one of the end members, comprises a ledge or deflector plate 31 secured as by rivets 33 to the bracket 24, and a gutter or conductor 32 which may be soldered or brazed to one of the end members as the radiator casing 16. In the form of invention shown in Fig. 5, the deflector plate is riveted to the cover member 23, as by rivets 33'. At 34 is shown a flexible packing or lining, suitably arranged between the cover member 23 and its supporting bracket, this lining serving to prevent rattling and the entrance of water therebetween.

Referring to Fig. 2, it will be seen that the rear end of the intermediate member 23 is mounted upon a bracket 24 which is supported on the frame side members 10 in the same manner and has the same devices mounted thereon as the front bracket.

Thus is provided a motor cover or intermediate member of the housing which is supported entirely upon brackets 24 independently of end members such as the radiator casing and dash, respectively.

While I have described the form of my invention which will be specifically claimed, it will be apparent that various modifications may be made without departing from the spirit and scope of my invention and will be covered thereby.

Having thus described my invention, what I claim and desire to secure by Letters Patent is:—

1. In a motor vehicle, the combination with the frame and the motor, of a motor housing comprising end members and an intermediate member supported independently of said end members.

2. In a motor vehicle, the combination with the frame and the motor, of a motor housing comprising an end member mounted on said frame, and a cover member mounted on said frame independently of said end member.

3. In a motor vehicle, the combination with the frame and the motor, of a motor housing comprising an end member mounted on said frame and adapted for movement relatively thereto, and a top and side member mounted on said frame contiguous to said end member and independently thereof.

4. In a motor vehicle, the combination with the frame and the motor, of a housing comprising an end member mounted on said frame, a cover member mounted on said frame independently of said end member, said members being so mounted as to leave a gap between them, and means comprising a deflector plate for closing said gap.

5. In a motor vehicle, the combination with the frame, and the motor, of a radiator casing supported on the frame adjacent one end of the motor, and a cover for the motor supported independently of the radiator casing.

6. In a motor vehicle, the combination with the frame and the motor, of a radiator casing supported on the frame adjacent one end of the motor, a cover for the motor and means for supporting the cover from the frame independently of but with its edge adjacent to the radiator casing.

7. In a motor vehicle, the combination with the frame and the motor, of a radiator casing supported on the frame adjacent one end of the motor, a cover for the motor, and a bracket mounted directly on the vehicle frame independently of the radiator casing for supporting the cover with its edge adjacent the radiator casing.

8. In a motor vehicle, the combination with the frame and the motor, of a dash supported on the frame adjacent one end of the motor, and a cover for the motor supported independently of the dash.

9. In a motor vehicle, the combination with the frame and the motor, of a radiator casing supported on the frame at one end of the motor, a dash supported on the frame at the other end of the motor, a motor cover arranged over the motor between the radiator casing and dash, and means for supporting the motor cover on the frame independently of the radiator casing and dash.

10. In a motor vehicle, the combination with the frame and the motor, of a flexibly supported radiator, and a cover for the motor supported substantially rigidly on the frame and independently of the radiator.

11. In a motor vehicle, the combination with the frame, of a radiator casing and motor cover each independently supported on said frame with adjacent edges, and means arranged between said adjacent edges for permitting relative movement while preventing passage of water therebetween.

12. In a motor vehicle, the combination with the frame, of a radiator casing and motor cover each independently supported on said frame with adjacent edges, a gutter on one of said edges and a coöperating flange on the other, for the purpose described.

13. In a motor vehicle, the combination of a radiator casing and a motor cover arranged with adjacent edges, a gutter on one of said edges and a coöperating flange on the other of said edges, for the purpose described.

14. In a motor vehicle, the combination with the frame, of a radiator casing and motor cover each independently supported on said frame with adjacent edges, a gutter on one of said edges and a downwardly extending flange on the other of said edges and adapted to rest in said gutter for the purpose described.

15. In a motor vehicle, the combination with the frame, of a radiator casing and motor cover each independently supported on said frame with adjacent edges, a gutter on the edge of the radiator casing, and a coöperating flange on the edge of the motor cover, for the purpose described.

16. In a motor vehicle, the combination with the frame, of a radiator casing, a motor cover, a bracket arranged adjacent the radiator casing and supporting the motor cover with an edge adjacent the edge of said radiator casing, a gutter on one of said edges and a coöperating flange on the other.

17. In a motor vehicle, the combination with the frame, of a radiator casing, a motor cover, a bracket following the edge of the radiator casing and supporting the motor cover with an edge thereof adjacent the edge of the radiator casing, a gutter on one of said edges and a coöperating flange on the other.

In testimony whereof I affix my signature in the presence of two witnesses.

HAROLD D. CHURCH.

Witnesses:
CLAIR J. COTE,
LE ROI J. WILLIAMS.

Copies of this patent may be obtained for five cents each, by addressing the "Commissioner of Patents, Washington, D. C."